United States Patent
Sato et al.

(10) Patent No.: US 9,656,196 B2
(45) Date of Patent: May 23, 2017

(54) FILTER MATERIAL FOR AIR FILTER, METHOD FOR MANUFACTURING SAME, AND AIR FILTER PROVIDED WITH SAME

(71) Applicant: HOKUETSU KISHU PAPER CO., LTD., Nagaoka-shi, Niigata (JP)

(72) Inventors: Masashi Sato, Nagaoka (JP); Hiroyuki Yamamoto, Nagaoka (JP); Eiko Meguro, Nagaoka (JP); Junji Nemoto, Nagaoka (JP); Toshihiko Soyama, Nagaoka (JP)

(73) Assignee: HOKUETSU KISHU PAPER CO., LTD., Niigata (JP)

( * ) Notice: Subject to any disclaimer, the term of this patent is extended or adjusted under 35 U.S.C. 154(b) by 0 days.

(21) Appl. No.: 14/781,275

(22) PCT Filed: Jan. 30, 2014

(86) PCT No.: PCT/JP2014/052092
§ 371 (c)(1),
(2) Date: Sep. 29, 2015

(87) PCT Pub. No.: WO2014/171165
PCT Pub. Date: Oct. 23, 2014

(65) Prior Publication Data
US 2016/0051920 A1 Feb. 25, 2016

(30) Foreign Application Priority Data
Apr. 15, 2013 (JP) ................. 2013-085030

(51) Int. Cl.
| | | |
|---|---|---|
| *D21H 13/40* | (2006.01) | |
| *B01D 39/06* | (2006.01) | |
| *D21H 13/24* | (2006.01) | |
| *D21H 21/18* | (2006.01) | |
| *B01D 39/20* | (2006.01) | |
| *D04H 1/4218* | (2012.01) | |
| *D04H 1/542* | (2012.01) | |
| *D21H 15/02* | (2006.01) | |
| *D21H 17/09* | (2006.01) | |
| *D21H 17/53* | (2006.01) | |
| *F24F 3/16* | (2006.01) | |

(52) U.S. Cl.
CPC ....... *B01D 39/2024* (2013.01); *D04H 1/4218* (2013.01); *D04H 1/542* (2013.01); *D21H 13/24* (2013.01); *D21H 13/40* (2013.01); *D21H 15/02* (2013.01); *D21H 17/09* (2013.01); *D21H 17/53* (2013.01); *B01D 2239/086* (2013.01); *B01D 2239/1233* (2013.01); *F24F 2003/1614* (2013.01)

(58) Field of Classification Search
CPC ........ D21H 13/40; D21H 13/24; D21H 15/02; D21H 27/08; D21H 13/10; D21H 17/09; D21H 17/53; D21H 19/20; B01D 39/2024; B01D 2239/1233; B01D 2239/064; B01D 39/1623; B01D 2239/086; B01D 2239/0216; B01D 39/06; Y10S 55/05; Y10T 442/2189; Y10T 442/631; D04H 1/4218; D04H 1/54; D04H 1/542; F24F 2003/1614
See application file for complete search history.

(56) References Cited

U.S. PATENT DOCUMENTS

| | | | | |
|---|---|---|---|---|
| 6,939,386 | B2 * | 9/2005 | Sato ................... | B01D 39/2017 428/436 |
| 8,114,197 | B2 * | 2/2012 | Sealey ............... | B01D 39/1623 442/331 |
| 2003/0145569 | A1 * | 8/2003 | Sato ................... | B01D 39/2017 55/524 |
| 2006/0117958 | A1 * | 6/2006 | Sakadume ............... | A61L 9/16 96/223 |
| 2006/0147804 | A1 * | 7/2006 | Yamamoto ............... | D04H 1/54 429/254 |
| 2010/0133173 | A1 * | 6/2010 | Inagaki ............... | B01D 39/1623 210/504 |
| 2010/0212272 | A1 * | 8/2010 | Sealey ............... | B01D 39/2024 55/361 |
| 2011/0147320 | A1 | 6/2011 | Sealey et al. | |
| 2011/0309012 | A1 * | 12/2011 | Rogers ............... | B01D 39/1615 210/323.1 |
| 2012/0031063 | A1 * | 2/2012 | Soyama ............... | B01D 39/163 55/527 |

(Continued)

FOREIGN PATENT DOCUMENTS

| | | |
|---|---|---|
| CN | 101098741 A | 1/2008 |
| CN | 102405088 A | 4/2012 |

(Continued)

OTHER PUBLICATIONS

International Preliminary Report on Patentability dated Oct. 29, 2015 from corresponding International Application No. PCT/JP2014/052092, 8 pages.

(Continued)

*Primary Examiner* — Jose Fortuna
(74) *Attorney, Agent, or Firm* — Ohlandt, Greeley, Ruggiero & Perle, L.L.P.

(57) ABSTRACT

A filter media for an air filter having a PF value higher than ever, and an air filter provided with the same. The filter media for an air filter is composed of wet-laid nonwoven fabric containing a glass fiber having an average fiber diameter of less than 1 and a binder fiber, and wherein the wet-laid nonwoven fabric contains a fluorine resin and a surfactant, and does not contain a resin binder or contains a binder resin in an amount of 50% by mass or less based on the fluorine resin.

4 Claims, No Drawings

(56) References Cited

U.S. PATENT DOCUMENTS

| | | | | |
|---|---|---|---|---|
| 2012/0248034 | A1* | 10/2012 | Segit | D21H 13/40 210/504 |
| 2013/0340398 | A1* | 12/2013 | Battenfeld | B01D 39/18 55/486 |
| 2013/0340613 | A1* | 12/2013 | Krupnikov | B01D 53/0407 95/90 |
| 2015/0107208 | A1* | 4/2015 | Battenfeld | B01D 39/18 55/528 |
| 2015/0140306 | A1* | 5/2015 | Endo | D04H 1/4218 428/219 |
| 2015/0157969 | A1* | 6/2015 | Sealey | B01D 39/2024 55/485 |
| 2016/0051920 | A1* | 2/2016 | Sato | D04H 1/4218 162/145 |
| 2016/0136553 | A1* | 5/2016 | Healey | B01D 39/14 55/486 |
| 2016/0166962 | A1* | 6/2016 | Sealey | B01D 39/2024 55/485 |

FOREIGN PATENT DOCUMENTS

| | | |
|---|---|---|
| EP | 2422866 A1 | 2/2012 |
| JP | 60-019016 | 1/1985 |
| JP | 02-041499 | 2/1990 |
| JP | 02-175997 | 7/1990 |
| JP | 06-015126 | 3/1994 |
| JP | 10-080612 A | 3/1998 |
| JP | 2010-080612 | 3/1998 |
| JP | 10-156116 | 6/1998 |
| JP | 2002-041499 | 2/2002 |
| JP | 2002-175997 | 6/2002 |
| JP | 2003-071219 | 3/2003 |
| JP | 2003-071219 | 11/2003 |
| JP | 2006-015126 | 1/2006 |
| JP | 2006-167491 | 6/2006 |
| JP | 2008-246321 | 10/2008 |
| JP | 2010-094580 | 4/2010 |
| JP | 2010-156116 | 7/2010 |
| JP | 2011-240311 | 1/2011 |
| JP | 2011-240311 A | 12/2011 |
| WO | 2006052732 A2 | 5/2006 |

OTHER PUBLICATIONS

Chinese Office Action dated Jun. 3, 2016 from corresponding Chinese Application No. 201480021183.3; 13 pages.
International Search Report dated Feb. 21, 2014 corresponding to International Patent Application No. PCT/JP2014/052092; 2 pages.
Japanese Office Action dated Aug. 23, 2016 from corresponding Japanese Patent Application No. JP2015-512328; 9 pages.
Extended European Search Report dated Oct. 28, 2016 from corresponding European Patent Application No. 14785326.1.
Second Chinese Office Action dated Feb. 4, 2017 from corresponding Chinese Patent Application No. 201480021183.3, 10 pages.
Korean Office Action dated Feb. 20, 2017 from corresponding Korean Patent Application No. 9-5-2017-013165897, 11 pages.

* cited by examiner

FILTER MATERIAL FOR AIR FILTER, METHOD FOR MANUFACTURING SAME, AND AIR FILTER PROVIDED WITH SAME

BACKGROUND OF THE DISCLOSURE

1. Technical Field of the Disclosure

The present invention relates to a filter media (a filter material) for an air filter. More specifically, the present invention relates to a filter media for an air filter used for a clean room and a clean bench, which are used in the field of semiconductors, liquid crystals, foods, pharmaceuticals, medical care, or the like, and an air filter provided with the same.

2. Description of the Related Art

In order to collect a dust particle having a submicron to micron unit in the air, a collecting technique of an air filter has been used. Air filters are classified by the difference of the particle diameter to be subjected, or the collecting efficiency, roughly into a coarse dust filter, a middle performance filter, a high performance filter (HEPA filter, and ULPA filter), and the like.

As the major properties required for a filter media for an air filter, there is a pressure drop showing airflow resistance of a filter media, in addition to the collecting efficiency. In order to increase the collecting efficiency of a filter media, it is required to increase the formulation of a fine fiber having a large surface area, however, the pressure drop of the filter media also increases at the same time. The high pressure drop increases the operation load of an intake fan, and causes the increase in the power consumption, therefore, is not preferred from the viewpoint of both of the energy saving and the reduction of running cost. Accordingly, a filter media for an air filter having both of the low pressure drop, and the high collecting efficiency is required. As an index value of the level of low pressure drop and high collecting efficiency of a filter media for an air filter, there is a PF value defined by an equation of Mathematical Equation 1. The high PF value shows that the filter media for an air filter has a low pressure drop and high collecting efficiency. Further, the penetration is obtained by the following equation:

Penetration [%]=100−collecting efficiency [%].

$$PF \text{ value} = \frac{\log_{10}(\text{Penetration}[\%]/100)}{\text{Pressure loss }[\%]/9.81} \times (-100) \quad \text{[Mathematical Equation 1]}$$

As a method for improving the PF value of a filter media for an air filter, of which the main fiber is a glass fiber, a method for allowing a fluorine-containing resin to adhere onto a surface of a fiber (for example, see Japanese Patent Application Publication No. H06-15126), a method for allowing a binder and a silicon resin to adhere to a fiber constituting filter paper (for example, see Japanese Patent Application Laid-Open (JP-A) No. H02-41499), and a method for allowing a binder, a fluorine resin, and a silicon resin to adhere to a fiber constituting filter paper (for example, see JP-A No. H02-175997) have been proposed.

Further, the present inventors have proposed the following techniques. (1) A method for allowing a binder, and a fluorine-based surfactant having the lowest surface tension of 20 dyne/cm or less at the time of adding into pure water at 25° C. to adhere to a glass fiber constituting a filter media (for example, see JP-A No. H10-156116), (2) a method for allowing a binder, and an ether type nonionic surfactant to adhere to a glass fiber constituting a filter media (for example, see JP-A No. 2006-167491), (3) a method for applying a binder liquid containing a cationic surfactant that is a quarternary ammonium salt to a filter media (for example, see JP-A No. 2010-94580), and (4) a method for allowing a binder, and an acetylene-based surfactant to adhere to a glass fiber constituting a filter media (for example, JP-A No. 2003-71219). It has shown by using these methods that the PF value of a filter media for an air filter can be increased by the prevention of clogging of pores due to a binder film.

SUMMARY OF THE DISCLOSURE

So far, increase of the PF value of a filter media for an air filter by using the above methods has been performed, however, further increase of the PF value is required from the viewpoint of the energy saving. Therefore, a problem of the present invention is to provide a filter media for an air filter having a PF value higher than ever, and an air filter provided with the same.

As a result of an investigation on the problem described above, the present inventors have found that the above-described problem can be solved by applying a fluorine resin and a surfactant to the wet-laid nonwoven fabric containing a glass fiber and a binder fiber. That is, the filter media for an air filter according to the present invention is composed of wet-laid nonwoven fabric containing a glass fiber having an average fiber diameter of less than 1 μm, and a binder fiber, and is characterized in that the wet-laid nonwoven fabric contains a fluorine resin and a surfactant, and does not contain a resin binder or contains a binder resin in an amount of 50% by mass or less based on the fluorine resin.

In the filter media for an air filter according to the present invention, it is preferred that the wet-laid nonwoven fabric further contains a main fiber. By imparting rigidity to the filter media, the shrinkage of a binder fiber can be suppressed.

In the filter media for an air filter according to the present invention, it is preferred that the glass fiber having an average fiber diameter of less than 1 μm, and the binder fiber are uniformly distributed each other. The phenomenon of aggregating the glass fibers each other is suppressed, and further the particle capturing action can be enhanced.

The method for producing a filter media for an air filter according to the present invention is characterized by including: a dispersing step of obtaining an aqueous slurry containing a glass fiber having an average fiber diameter of less than 1 μm and a binder fiber; a papermaking step of obtaining a sheet in a wet state by wet papermaking of the aqueous slurry; an impregnating step in which the sheet in a wet state is impregnated with an aqueous dispersion containing a fluorine resin and a surfactant, and not containing a binder resin or containing a binder resin in an amount of 50% by mass or less based on the fluorine resin, and the fluorine resin and the surfactant are allowed to adhere onto surfaces of the glass fiber having an average fiber diameter of less than 1 μm and the binder fiber; and a drying step of drying the sheet in a wet state impregnated with the aqueous dispersion.

In the method for producing a filter media for an air filter according to the present invention, it is preferred that a main fiber is further contained. Rigidity is imparted to the filter media, and the shrinkage of a binder fiber can be suppressed.

The air filter according to the present invention is characterized by being provided with the filter media for an air filter according to the present invention.

By using the method of the present invention, a filter media for an air filter having an extremely high PF value, and an air filter provided with the same can be provided.

DETAILED DESCRIPTION OF THE EMBODIMENTS

Hereinafter, the embodiment of the present invention will be described in detail, however, the present invention is not construed as being limited to these descriptions. As long as the effects of the present invention are exerted, the embodiment may be various kinds of modifications.

The filter media for an air filter according to the present embodiment is constituted of wet-laid nonwoven fabric, and produced by using a wet papermaking step including the following steps. (1) A dispersing step of obtaining a slurry by dispersing fibers in water, (2) a papermaking step of laminating the slurry on a net to be sheeted, (3) an impregnating step of impregnating the sheet with the impregnation solution containing a processing material and allowing the processing material to adhere to the sheet, and (4) a drying step of drying the sheet.

The filter media for an air filter of the present embodiment contains a glass fiber (hereinafter, referred to as submicron glass fiber) having an average fiber diameter of less than 1 μm. The submicron glass fiber is dispersed in water together with other fibers in a dispersing step, and sheeted in a papermaking step. As to the main reason for using a glass fiber, there are two reasons that a fiber having a small diameter (for example, the average fiber diameter is less than 1 μm) with a large surface area contributing to the collecting efficiency is easily obtained, and further that voids through which air passes can be maintained since a glass fiber has an adequate stiffness. The average fiber diameter is determined by the calculation from the measurement value of surface area.

In the filter media for an air filter of the present embodiment, a fluorine resin and a surfactant are contained in the wet-laid nonwoven fabric containing a submicron glass fiber. The fluorine resin and the surfactant are applied to the sheet containing a submicron glass fiber as an aqueous dispersion in an impregnating step. These action mechanisms are presumed as follows. In a case where only a fluorine resin is added, colloidal particles of the fluorine resin adhere onto the surface of a glass fiber in a state of placing a hydrophilic group toward the outside in a wet state after the impregnating step, however, the fluorine resin surface having strong repulsion force appears in a drying step, and an effect of uniformly dispersing glass fibers without aggregating the glass fibers each other is expressed. However, although water repellency is imparted, improvement of the PF value is not observed. Next, in a case where only a surfactant is added, a hydrophilic group of the surfactant adheres onto the surface of a glass fiber, and a hydrophobic group is placed toward the outside, as a result of which, an effect of uniformly dispersing glass fibers is expressed. Although the improvement of the PF value is observed, it cannot be said that the degree is sufficient. On the other hand, when a fluorine resin and a surfactant are contained at the same time, the phenomenon that a hydrophilic group of the surfactant adheres onto the surface of a glass fiber, and a hydrophobic group is placed toward the outside, as a result of which, an effect of uniformly dispersing glass fibers is expressed, and further the surfactant adheres onto the surface of a colloidal particle of the fluorine resin, as a result of which the surface state of the colloidal particle of the fluorine resin is changed, and the adsorbed amount of the colloidal particle of the fluorine resin onto the glass fiber is decreased is generated. As a result, although the reason is unclear, the PF value higher than that in a case where only a surfactant is added is obtained. Further, the colloidal particle of the fluorine resin, onto the surface of which the surfactant adheres, expresses the effect of suppressing the phenomenon of aggregating the glass fibers each other in a wet state. By such a synergistic effect of two components, when submicron glass fibers become in a state uniformly dispersed in a filter media, the action of capturing particles becomes larger, and a filter media having a high PF value is obtained.

The filter media for an air filter of the present embodiment contains a binder fiber. The binder fiber is dispersed in water together with a submicron glass fiber in a dispersing step, and sheeted in a papermaking step, and imparts strength to the filter media for an air filter. In general, in order to impart strength to glass fiber wet-laid nonwoven fabric, application of a binder resin is widely performed in an impregnating step, however, in the method of the present embodiment, when a binder resin composed of other than the fluorine resin is present in an impregnating step, the above-described effect of the fluorine resin and the surfactant is significantly inhibited. Accordingly, in the present embodiment, as a method of imparting strength, a method in which a binder resin composed of other than the fluorine resin is not used in an impregnating step, or a small amount of a binder resin (for example, 50% by mass or less based on the fluorine resin) is only supplementary used, and a binder fiber is sheeted together with a submicron glass fiber in a dispersing and papermaking step, is used. Accordingly, the binder fiber is sheeted in a state of being uniformly distributed to the submicron glass fiber.

The submicron glass fiber is mainly a glass fiber in a wool state, which is produced by a flame blowing method in which glass is blown off while being melted by a flame of a high-pressure burner, and a glass fiber having various fiber diameters is appropriately selected depending on the filtration performance to be required. Further, for the purpose of preventing the contamination in a semiconductor step, a low-boron glass fiber, a silica glass fiber, and the like can also be used.

The mixing ratio of the submicron glass fiber is appropriately selected depending on the filtration performance to be required, however, preferably 1 to 90% by mass, and more preferably 3 to 60% by mass, based on the total fiber mass of the fibers contained in a sheet. When the submicron glass fiber is less than 1% by mass, there may be a case where the required filtration performance cannot be obtained. When the submicron glass fiber is more than 90% by mass, the mixing ratio of a binder fiber becomes less than 10% by mass, therefore, there may be a case where sufficient strength cannot be obtained.

The fluorine resin is appropriately selected from the resins containing a fluorine atom in the molecule, however, an aqueous dispersion composed of a perfluoroalkyl group-containing resin that is available on the market as a water repellent agent, an oil repellent agent, or an antifouling agent is preferably used. These have a high effect of improving the PF value of a filter media for an air filter, and further can also impart water repellency to a filter media for an air filter. Further, it is preferred that in a production raw material or a product, a fluorine resin not containing perfluorooctanoic acid (PFOA) and perfluorooctanesulfonic acid (PFOS) that have hard decomposability and bioaccumulation potential is selected.

The surfactant is appropriately selected from the surfactants having various ionicities (anionicity, cationicity, and the like) and compositions (hydrocarbon-based, fluorine-based, and the like), however, an anionic surfactant is preferred. Among them, an anionic surfactant composed of a sulfuric ester salt or a sulfonate is particularly preferred. As the surfactant, for example, there are an alkyl sulfate, an alkylphenyl sulfate, a styrenated phenyl sulfate, a polyoxyethylene alkyl ether sulfate, a polyoxyethylene alkylphenyl ether sulfate, a polyoxyethylene styrenated phenyl ether sulfate, an alkylsulfonic acid salt, an alfa-olefin sulfonate, an alkylbenzene sulfonate, a sulfosuccinic acid salt, and the like.

As to the solid mass ratio of the fluorine resin and the surfactant, the surfactant is preferably 0.5 to 20 parts by mass, more preferably 1 to 15 parts by mass, and furthermore preferably 2 to 12 parts by mass, based on 100 parts by mass of the fluorine resin. When the mass ratio of the surfactant is less than 0.5 part by mass based on 100 parts by mass of the amount of fluorine resin, a sufficient effect of improving the PF value cannot be obtained. When the mass ratio of the surfactant is more than 20 parts by mass, an effect of improving the PF value due to the increase of the amount of surfactant becomes small, the product cost is unnecessarily increased, and further the strength, and water resistance of a filter media can be decreased.

As to the adhering amount of the solid of the fluorine resin and the surfactant based on the total mass of the filter media, the total amount of the fluorine resin and the surfactant is preferably 0.01 to 5% by mass, more preferably 0.05 to 3% by mass, and furthermore preferably 0.1 to 2% by mass. When the total adhering amount of the solid of the fluorine resin and the surfactant is less than 0.01% by mass, a sufficient effect of improving the PF value cannot be obtained. When the adhering amount of the solid is more than 5% by mass, an effect of improving the PF value due to the increase of the adhering amount becomes small, and the product cost is unnecessarily increased. Further, the total mass of the filter media is the dry mass of the filter media containing a fiber, a fluorine resin, and a surfactant.

The binder fiber can be used in a wet papermaking step, and is appropriately selected from the fibers that can impart sufficient strength to a filter media for an air filter. As the main binder fiber, there are a fibrillated fiber that imparts strength by the entanglement of fine fibers, and a heat-melt fiber that imparts strength by heat melting or hot water dissolving, and bonding the fibers to each other, however, there may be a case where the fibrillated fiber clogs the meshes of a filter media, and largely increases the pressure drop, therefore, a heat-melt fiber is preferably used. As the form of the heat-melt fiber, there are a side-by-side type fiber composed of a non-melting component at one side, and a melting component at the other side of a cross section of a fiber, a sheath-core type fiber composed of a non-melting component in a core part, and a melting component in a sheath part of a cross section of a fiber, and the like, in addition to the wholly melting fiber in which the entire fiber is melted.

As the binder fiber in the present embodiment, a sheath-core type fiber having a large strength imparting effect, and a relatively small influence on the PF value is preferably used. The component in a core part of a sheath-core type fiber is selected from the polymers having the insolubility, strength, and heat resistance, which can maintain the form of a fiber without being almost dissolved or melted in a filter media produced through a wet papermaking step including dispersing, papermaking, impregnating, and drying, and examples of the component in a core part include polyester, polyolefin, polyamide, polyurethane, polyacrylonitrile, and a cellulosic polymer. On the other hand, the component in a sheath part is selected from the polymers, which is dissolved or melted by heating, and bonded to a glass fiber in a wet papermaking step, and examples of the component in a sheath part include polyester, polyolefin, poly(ethylene-vinyl acetate), polyvinyl alcohol, and poly(ethylene-vinyl alcohol).

The fiber diameter of the binder fiber is preferably 5 to 50 µm, and more preferably 7 to 30 µm. When the fiber diameter is smaller than 5 µm, there may be a case where the pressure drop is increased and the PF value is decreased. When the fiber diameter is larger than 50 µm, there may be a case where a sufficient strength imparting effect cannot be obtained. Further, the fiber length of the binder fiber is preferably 2 to 20 mm, and more preferably 5 to 10 mm. When the fiber length is smaller than 2 mm, there may be a case where sufficient strength cannot be obtained. When the fiber length is larger than 20 mm, a twist is easily generated in a dispersing step, and which may be a drawback to a filter media.

The mixing ratio of the binder fiber is preferably 5 to 90% by mass, more preferably 10 to 70% by mass, and furthermore preferably 20 to 60% by mass, based on the total fiber mass of the fibers contained in a sheet. When the mixing ratio of the binder fiber is less than 5% by mass, there may be a case where sufficient strength cannot be obtained. When the mixing ratio of the binder fiber exceeds 90% by mass, there may be a case where the shrinkage becomes large when the binder fiber is heat melted.

In the present embodiment, in addition to the submicron glass fiber and the binder fiber, various main fibers (non-binder fibers) can appropriately be used depending on the properties to be required. These binder fibers can be used in a wet papermaking step, and are appropriately selected from among the fibers that do not largely decrease the PF value of a filter media for an air filter. In the present embodiment, in order to impart the rigidity to a filter media, or suppress the shrinkage of a binder fiber, a main fiber having stiffness is preferred. As such a main fiber, for example, there are a glass wool fiber having an average fiber diameter of 1 µm or more, a chopped glass fiber, a polyvinyl alcohol main fiber, an aramid fiber, a carbon fiber, and the like. The mixing ratio of such a main fiber is preferably 2 to 94% by mass, more preferably 5 to 70% by mass, and furthermore preferably 10 to 50% by mass, based on the total fiber mass of the fibers contained in a sheet.

The first embodiment of the air filter according to the present embodiment is an embodiment in which a pleating process of folding the air filter media according to the present embodiment in a zigzag form is performed, a separator made of paper or an aluminum plate is sandwiched between the pleats of the filter media as an interval holding member between the pleats, and the resultant is assembled to a unit by an aluminum frame, a wooden frame, or the like. Further, the second embodiment is an embodiment of a mini-pleat structure in which a bead-like adhesive composed of a hot-melt resin, and the like is used in place of the above-described separator as an interval holding member.

EXAMPLES

Hereinafter, the present invention will be described in more detail by way of Examples, however, the present invention should not be construed to be limited to the following Examples. Further, "parts" and "%" in the examples indicate "parts by mass" and "% by mass" unless otherwise specified.

Example 1

25 parts by mass of a submicron glass wool fiber (B-00-F, average fiber diameter 0.33 μm, manufactured by Lauscha Fiber International Co.), 40 parts by mass of a polyester sheath-core binder fiber (ester 4080, fineness 1.7 dtx (fiber diameter 13 μm), fiber length 5 mm, manufactured by UNITIKA LTD.), and 35 parts by mass of a chopped glass fiber (CS06JAGP024, fiber diameter 10 μm, fiber length 6 mm, manufactured by OWENS CORNING JAPAN LLC) were dispersed in the water adjusted to pH 3.0 with sulfuric acid, the resultant dispersion was disintegrated by using a pulper, and a fiber slurry having a solid content concentration of 0.5% was obtained. Next, the obtained slurry was subjected to papermaking using a hand sheet former to obtain wet paper. Next, 100 parts of a fluorine resin (NK GUARD S-09, manufactured by NICCA CHEMICAL CO., LTD.), and 2 parts of a sodium alkyl sulfate surfactant (EMAL 10G, manufactured by Kao Corporation) were added into water, the solid content concentration of the mixture was adjusted to 0.204% by mass to obtain an impregnation solution, and wet paper was impregnated with and applied by the impregnation solution, the excess impregnation solution was removed by suction, and then the wet paper was dried by using a rotary dryer at 130° C. to obtain a filter media for an air filter, which has a basis weight of 80 g/m$^2$. In addition, the adhering amount of the impregnation solution was 0.8 g/m$^2$ in terms of a solid content.

Example 2

Except for using an impregnation solution obtained by adding 100 parts of a fluorine resin (NK GUARD S-09, manufactured by NICCA CHEMICAL CO., LTD.), and 8 parts of a sodium alkyl sulfate surfactant (EMAL 10G, manufactured by Kao Corporation) into water, and adjusting the solid content concentration of the mixture to 0.216% by mass, a filter media for an air filter, which has a basis weight of 80 g/m$^2$, was obtained in the same manner as in Example 1. In addition, the adhering amount of the impregnation solution was 0.8 g/m$^2$ in terms of a solid content.

Example 3

Except for using an impregnation solution obtained by adding 100 parts of a fluorine resin (NK GUARD S-09, manufactured by NICCA CHEMICAL CO., LTD.), and 12 parts of a sodium alkyl sulfate surfactant (EMAL 10G, manufactured by Kao Corporation) into water, and adjusting the solid content concentration of the mixture to 0.224% by mass, a filter media for an air filter, which has a basis weight of 80 g/m$^2$, was obtained in the same manner as in Example 1. In addition, the adhering amount of the impregnation solution was 0.8 g/m$^2$ in terms of a solid content.

Example 4

Except for using an impregnation solution obtained by adding 100 parts of a fluorine resin (NK GUARD S-09, manufactured by NICCA CHEMICAL CO., LTD.), and 8 parts of a sodium alkylbenzene sulfonate surfactant (NEOPELEX GS, manufactured by Kao Corporation) into water, and adjusting the solid content concentration of the mixture to 0.216% by mass, a filter media for an air filter, which has a basis weight of 80 g/m$^2$, was obtained in the same manner as in Example 1. In addition, the adhering amount of the impregnation solution was 0.8 g/m$^2$ in terms of a solid content.

Example 5

Except for using an impregnation solution obtained by adding 100 parts of a fluorine resin (NK GUARD S-09, manufactured by NICCA CHEMICAL CO., LTD.), and 8 parts of a fluorine-based anionic surfactant (FTERGENT 150, manufactured by NEOS COMPANY LIMITED.) into water, and adjusting the solid content concentration of the mixture to 0.216% by mass, a filter media for an air filter, which has a basis weight of 80 g/m$^2$, was obtained in the same manner as in Example 1. In addition, the adhering amount of the impregnation solution was 0.8 g/m$^2$ in terms of a solid content.

Example 6

25 parts by mass of a submicron glass wool fiber (B-00-F, average fiber diameter 0.33 μm, manufactured by Lauscha Fiber International Co.), 39 parts by mass of a polyester sheath-core binder fiber (ester 4080, fineness 4.4 dtx (fiber diameter 20 μm), fiber length 5 mm, manufactured by UNITIKA LTD.), and 1 part by mass of a polyvinyl alcohol binder fiber (SPG056-11, fineness 0.8 dtx (fiber diameter 7 μm), fiber length 3 mm, manufactured by KURARAY CO., LTD.), and 35 parts by mass of a chopped glass fiber (CS06JAGP024, fiber diameter 10 μm, fiber length 6 mm, manufactured by OWENS CORNING JAPAN LLC) were dispersed in the water adjusted to pH 3.0 with sulfuric acid, the resultant dispersion was disintegrated by using a pulper, and a fiber slurry having a solid content concentration of 0.5% by mass was obtained. Next, the obtained slurry was subjected to the papermaking using a hand sheet former to obtain wet paper. Next, 100 parts of a fluorine resin (NK GUARD S-09, manufactured by NICCA CHEMICAL CO., LTD.), and 8 parts of a sodium alkyl sulfate surfactant (EMAL 10G, manufactured by Kao Corporation) were added into water, the solid content concentration of the mixture was adjusted to 0.216% by mass to obtain an impregnation solution, and wet paper was impregnated with and applied by the impregnation solution, the excess impregnation solution was removed by suction, and then the wet paper was dried by using a rotary dryer at 130° C. to obtain a filter media for an air filter, which has a basis weight of 80 g/m$^2$. In addition, the adhering amount of the impregnation solution was 0.8 g/m$^2$ in terms of a solid content.

Example 7

25 parts by mass of a submicron glass wool fiber (B-00-F, average fiber diameter 0.33 μm, manufactured by Lauscha Fiber International Co.), 40 parts by mass of a polyester sheath-core binder fiber (ester 4080, fineness 1.7 dtx (fiber diameter 13 μm), fiber length 5 mm, manufactured by UNITIKA LTD.), and 35 parts by mass of a polyvinyl alcohol main fiber (RM702, fineness 7 dtx (fiber diameter 26 μm), fiber length 5 mm, manufactured by KURARAY CO., LTD.) were dispersed in the water adjusted to pH 3.0 with sulfuric acid, the resultant dispersion was disintegrated by using a pulper, and a fiber slurry having a solid content concentration of 0.5% by mass was obtained. Next, the obtained slurry was subjected to the papermaking using a hand sheet former to obtain wet paper. Next, 100 parts of a fluorine resin (NK GUARD S-09, manufactured by NICCA CHEMICAL CO., LTD.), and 8 parts of a sodium alkyl sulfate surfactant (EMAL 10G, manufactured by Kao Corporation) were added into water, the solid content concentration of the mixture was adjusted to 0.216% by mass to obtain an impregnation solution, and wet paper was impregnated with and applied by the impregnation solution, the excess impregnation solution was removed by suction, and then the wet paper was dried by using a rotary dryer at 130° C. to obtain a filter media for an air filter, which has a basis weight of 80 g/m². In addition, the adhering amount of the impregnation solution was 0.8 g/m² in terms of a solid content.

Example 8

15 parts by mass of a submicron glass wool fiber (B-06-F, average fiber diameter 0.65 μm, manufactured by Lauscha Fiber International Co.), 50 parts by mass of a polyester sheath-core binder fiber (ester 4080, fineness 1.7 dtx (fiber diameter 13 μm), fiber length 5 mm, manufactured by UNITIKA LTD.), and 35 parts by mass of a chopped glass fiber (CS06JAGP024, fiber diameter 10 μm, fiber length 6 mm, manufactured by OWENS CORNING JAPAN LLC) were dispersed in the water adjusted to pH 3.0 with sulfuric acid, the resultant dispersion was disintegrated by using a pulper, and a fiber slurry having a solid content concentration of 0.5% by mass was obtained. Next, the obtained slurry was subjected to the papermaking using a hand sheet former to obtain wet paper. Next, 100 parts of a fluorine resin (NK GUARD S-09, manufactured by NICCA CHEMICAL CO., LTD.), and 8 parts of a sodium alkyl sulfate surfactant (EMAL 10G, manufactured by Kao Corporation) were added into water, the solid content concentration of the mixture was adjusted to 0.216% by mass to obtain an impregnation solution, and wet paper was impregnated with and applied by the impregnation solution, the excess impregnation solution was removed by suction, and then the wet paper was dried by using a rotary dryer at 130° C. to obtain a filter media for an air filter, which has a basis weight of 80 g/m². In addition, the adhering amount of the impregnation solution was 0.8 g/m² in terms of a solid content.

Example 9

Except for using an impregnation solution obtained by adding 100 parts of a fluorine resin (NK GUARD S-09, manufactured by NICCA CHEMICAL CO., LTD.), 8 parts of a sodium alkyl sulfate surfactant (EMAL 10G, manufactured by Kao Corporation), and 50 parts of an acrylic binder resin (Mowinyl LDM7222, manufactured by The Nippon Synthetic Chemical Industry Co., Ltd.) into water, and adjusting the solid content concentration of the mixture to 0.316% by mass, a filter media for an air filter, which has a basis weight of 80 g/m², was obtained in the same manner as in Example 1. In addition, the adhering amount of the impregnation solution was 1.2 g/m² in terms of a solid content.

Comparative Example 1

Except for using an impregnation solution obtained by adding only 100 parts of a fluorine resin (NK GUARD S-09, manufactured by NICCA CHEMICAL CO., LTD.) into water, and adjusting the solid content concentration of the mixture to 0.200% by mass, a filter media for an air filter, which has a basis weight of 80 g/m², was obtained in the same manner as in Example 1. In addition, the adhering amount of the impregnation solution was 1.0 g/m² in terms of a solid content.

Comparative Example 2

25 parts by mass of a submicron glass wool fiber (B-00-F, average fiber diameter 0.33 μm, manufactured by Lauscha Fiber International Co.), 40 parts by mass of a micron glass wool fiber (B-26-R, average fiber diameter 2.4 μm, manufactured by Lauscha Fiber International Co.), and 35 parts by mass of a chopped glass fiber (CS06JAGP024, fiber diameter 10 μm, fiber length 6 mm, manufactured by OWENS CORNING JAPAN LLC) were dispersed in the water adjusted to pH 3.0 with sulfuric acid, the resultant dispersion was disintegrated by using a pulper, and a fiber slurry having a solid content concentration of 0.5% by mass was obtained. Next, the obtained slurry was subjected to the papermaking using a hand sheet former to obtain wet paper. Next, 100 parts of a fluorine resin (NK GUARD S-09, manufactured by NICCA CHEMICAL CO., LTD.), and 8 parts of a sodium alkyl sulfate surfactant (EMAL 10G, manufactured by Kao Corporation) were added into water, the solid content concentration of the mixture was adjusted to 0.216% by mass to obtain an impregnation solution, and wet paper was impregnated with and applied by the impregnation solution, the excess impregnation solution was removed by suction, and then the wet paper was dried by using a rotary dryer at 130° C. to obtain a filter media for an air filter, which has a basis weight of 80 g/m². In addition, the adhering amount of the impregnation solution was 0.8 g/m² in terms of a solid content.

Comparative Example 3

Except for using an impregnation solution obtained by adding 100 parts of a fluorine resin (NK GUARD S-09, manufactured by NICCA CHEMICAL CO., LTD.), 8 parts of a sodium alkyl sulfate surfactant (EMAL 10G, manufactured by Kao Corporation), and 100 parts of an acrylic binder resin (Mowinyl LDM7222, manufactured by The Nippon Synthetic Chemical Industry Co., Ltd.) into water, and adjusting the solid content concentration of the mixture to 0.416% by mass, a filter media for an air filter, which has a basis weight of 80 g/m², was obtained in the same manner as in Example 1. In addition, the adhering amount of the impregnation solution was 1.5 g/m² in terms of a solid content.

Comparative Example 4

Except for using an impregnation solution obtained by adding only 100 parts of a fluorine-based anionic surfactant (FTERGENT 150, manufactured by NEOS COMPANY LIMITED.) into water, and adjusting the solid content concentration of the mixture to 0.016% by mass, a filter media for an air filter, which has a basis weight of 80 g/m², was obtained in the same manner as in Example 1. In addition, the adhering amount of the impregnation solution was 0.1 g/m² in terms of a solid content.

Evaluation of the filter media for an air filter, which had been obtained in each of Examples and Comparative Examples, was performed by using the method shown below.

The pressure drop was measured as a differential pressure when air passes through a filter media with an effective area of 100 cm² at a face velocity of 5.3 cm/sec by using a manometer (Manostar Gage WO81, manufactured by Yamamoto Electric Works Co., Ltd.).

As to the penetration (also referred to as particle penetration), each of the numbers of polydisperse dioctyl phthalate (DOP) particles upstream and downstream when air containing the DOP particles generated by a Laskin nozzle passes through a filter media with an effective area of 100 cm² at a face velocity of 5.3 cm/sec as measured by using a laser particle counter (KC-18, manufactured by RION Co., Ltd.), and the penetration was determined by the calculation from the number values. In addition, the particle diameter to be targeted was set as 0.30 to 0.40 μm.

The PF value was calculated from the values of the pressure drop and the particle penetration by using an equation shown by Mathematical Equation 1. In addition, the particle diameter to be targeted was set as 0.30 to 0.40 μm.

The tensile strength was measured in accordance with JIS P 8113: 2006 "Paper and board-Determination of tensile properties-Part 2: Constant rate of elongation method" by using a universal testing machine (Autograph AGS-X, manufactured by Shimadzu Corporation).

The water repellency was measured in accordance with MIL-STD-282 by using a self-made water repellency testing machine.

The discharge process of a filter media was performed in accordance with 2) IPA saturated vapor exposure method in d) of 5.2.3.3 of JIS B 9908: 2011 "Test method of air filter units for ventilation and electric air cleaners for ventilation".

Evaluation results of the filter medias for an air filter, which had been obtained in Examples and Comparative Examples, were shown in Table 1 and Table 2.

TABLE 1

|  | Example 1 | Example 2 | Example 3 | Example 4 | Example 5 | Example 6 | Example 7 |
|---|---|---|---|---|---|---|---|
| Submicron glass fiber (mixing ratio) | 0.33μ Glass wool (25%) | 0.33μ Glass wool (25%) | 0.33μ Glass wool (25%) | 0.33μ Glass wool (25%) | 0.33μ Glass wool (25%) | 0.33μ Glass wool (25%) | 0.33μ Glass wool (25%) |
| Binder fiber (mixing ratio) | 13μ PEs sheath core (40%) | 13μ PEs sheath core (40%) | 13μ PEs sheath core (40%) | 13μ PEs sheath core (40%) | 13μ PEs sheath core (40%) | 20μ PEs sheath core/7μ PVA binder (39%/1%) | 13μ PEs sheath core (40%) |
| Other fibers (mixing ratio) | 10μ Chopped glass (35%) | 10μ Chopped glass (35%) | 10μ Chopped glass (35%) | 10μ Chopped glass (35%) | 10μ Chopped glass (35%) | 10μ Chopped glass (35%) | 26μ PVA main (35%) |
| Fluorine resin/surfactant Solid mass ratio | 100/2 | 100/8 | 100/12 | 100/8 | 100/8 | 100/8 | 100/8 |
| Surfactant | Sulfuric ester salt | Sulfuric ester salt | Sulfuric ester salt | Sulfonate | Fluorine-based | Sulfuric ester salt | Sulfuric ester salt |
| Pressure drop [Pa] | 218 | 210 | 207 | 209 | 209 | 211 | 211 |
| 0.3-0.4 μm Particle penetration [%] | 0.0111 | 0.0052 | 0.0041 | 0.0060 | 0.0064 | 0.0115 | 0.0082 |
| PF value | 17.8 | 20.0 | 20.8 | 19.8 | 19.7 | 18.3 | 19.0 |
| Tensile strength [kN/m] | 0.52 | 0.50 | 0.45 | 0.50 | 0.49 | 0.56 | 0.50 |
| Water repellency [in water column height] | 760 | 360 | 260 | 350 | 320 | 360 | 350 |

|  | Example 8 | Example 9 | Comparative Example 1 | Comparative Example 2 | Comparative Example 3 | Comparative Example 4 |
|---|---|---|---|---|---|---|
| Submicron glass fiber (mixing ratio) | 0.65μ Glass wool (15%) | 0.33μ Glass wool (25%) | 0.33μ Glass wool (25%) | 0.33μ Glass wool (25%) | 0.33μ Glass wool (25%) | 0.33μ Glass wool (25%) |
| Binder fiber (mixing ratio) | 13μ PEs sheath core (50%) | 13μ PEs sheath core (40%) | 13μ PEs sheath core (40%) | None | 13μ PEs sheath core (40%) | 13μ PEs sheath core (40%) |
| Other fibers (mixing ratio) | 10μ Chopped glass (35%) | 10μ Chopped glass (35%) | 10μ Chopped glass (35%) | 2.4μ Glass wool/10μ Chopped glass (40%/35%) | 10μ Chopped glass (35%) | 10μ Chopped glass (35%) |
| Fluorine resin/surfactant Solid mass ratio | 100/8 | 100/8 + Acrylic binder resin 50 | 100/8 | 100/8 | 100/8 + Acrylic binder resin 100 | 0/100 |
| Surfactant | Sulfuric ester salt | Sulfuric ester salt | None | Sulfuric ester salt | Sulfuric ester salt | Fluorine-based |
| Pressure drop [Pa] | 21.0 | 210 | 222 | 268 | 212 | 206 |
| 0.3-0.4 μm Particle penetration [%] | 38.43 | 0.0198 | 0.0501 | 0.0002 | 0.0447 | 0.0380 |
| PF value | 19.4 | 17.3 | 14.3 | 20.9 | 15.5 | 16.3 |
| Tensile strength [kN/m] | 0.47 | 0.66 | 0.88 | 0.09 | 0.82 | 0.38 |
| Water repellency [in water column height] | 290 | 320 | 1180 | 380 | 300 | 0 |

TABLE 2

|  | Example 8 Discharge process | |
| --- | --- | --- |
|  | Before discharge process | After discharge process |
| Pressure drop [Pa] | 21.0 | 21.0 |
| 0.3-0.4 μm Particle penetration [%] | 38.43 | 38.50 |
| PF value | 19.4 | 19.4 |

As is clear from the results of Table 1, according to the method of the present invention, a filter media for an air filter having a high PF value (for example, 17.0 or more), and strength required for practical use (for example, 0.44 kN/m or more) can be obtained.

On the other hand, in Comparative Example 1, wet paper was not impregnated with a surfactant, but was impregnated with only a fluorine resin, therefore, the particle penetration was high, and the PF value was low. In Comparative Example 2, a binder fiber was not mixed, therefore, the tensile strength was low. In Comparative Example 3, wet paper was impregnated with a binder resin exceeding 50% by mass based on a fluorine resin, together with the fluorine resin, and a surfactant, therefore, the PF value was low. In Comparative Example 4, wet paper was impregnated with only a surfactant, therefore, the PF value was low.

Table 2 shows results indicating the influences of discharge process on the filtration performance in a filter media of Example 8. The filter media for an air filter according to the present invention has a filtration mechanism by mechanical collection of a submicron glass fiber, which does not depend on the electric charge on the fiber surface, therefore, the filtration performance hardly changes before and after the discharge process. That is, the filter media for an air filter according to the present invention is characterized in that the filtration performance is not largely decreased during the use as in an electret filter media.

What is claimed is:

1. A method for producing a filter media for an air filter, comprising:
    obtaining an aqueous slurry that comprises a glass fiber having an average fiber diameter of less than 1 μm and a binder fiber having a fiber diameter from 5 to 50 μm, wherein the binder fiber is a heat-melt fiber;
    obtaining a first sheet in a wet state by wet papermaking of the aqueous slurry;
    impregnating the first sheet with an aqueous dispersion containing a fluorine resin, a surfactant, and a binder resin in an amount of at most 50% by mass based on the fluorine resin, thus yielding an impregnated sheet; and
    drying and heating the impregnated sheet to melt the binder fiber, thus yielding a dry sheet,
    wherein the glass fiber is in a mixing ratio from 1% to 90% by mass of the glass fiber to the total fiber mass of the fibers contained in the dry sheet,
    wherein the binder fiber is in a mixing ratio from 5% to 90% by mass of the binder fiber to the total fiber mass of the fibers contained in the dry sheet, and
    wherein the fluorine resin and the surfactant are in an adhering amount that is from 0.01% to 5% by mass of a total mass of the filter media.

2. The method according to claim 1, wherein the aqueous slurry further comprises at least a third fiber selected from the group consisting of: a glass wool fiber having an A average fiber diameter of 1 μm or more, a chopped glass fiber, a polyvinyl alcohol fiber, an aramid fiber, and a carbon fiber, and
    wherein the third fiber is in a mixing ratio from 2% to 94% by mass of the third fiber to the total fiber mass of the fibers contained in the dry sheet.

3. The method according to claim 1, wherein the binder fiber is a sheath-core type fiber.

4. The method according to claim 1, wherein the binder fiber has a diameter that is from 7 μm to 50 μm.

* * * * *